United States Patent
Lin et al.

(10) Patent No.: US 11,932,748 B2
(45) Date of Patent: Mar. 19, 2024

(54) DI(2-ETHYLHEXYL) TEREPHTHALATE COMPOSITION

(71) Applicant: CHANG CHUN PLASTICS CO., LTD., Taipei (TW)

(72) Inventors: Mei Yu Lin, Taipei (TW); Chih-Hung Chang, Taipei (TW)

(73) Assignee: CHANG CHUN PLASTICS CO., LTD., Taipei (TW)

( * ) Notice: Subject to any disclaimer, the term of this patent is extended or adjusted under 35 U.S.C. 154(b) by 0 days.

(21) Appl. No.: 17/806,145

(22) Filed: Jun. 9, 2022

(65) Prior Publication Data
US 2023/0047453 A1 Feb. 16, 2023

(30) Foreign Application Priority Data
Jul. 27, 2021 (TW) .................................. 110127574

(51) Int. Cl.
| | | |
|---|---|---|
| *C08K 5/12* | (2006.01) | |
| *C08K 5/00* | (2006.01) | |
| *G01N 30/02* | (2006.01) | |

(52) U.S. Cl.
CPC .............. *C08K 5/12* (2013.01); *C08K 5/0016* (2013.01); *G01N 30/02* (2013.01); *G01N 2030/025* (2013.01)

(58) Field of Classification Search
CPC . C08K 5/12; C08K 5/10; G01N 30/02; G01N 2030/025
See application file for complete search history.

(56) References Cited

U.S. PATENT DOCUMENTS

| | | | |
|---|---|---|---|
| 9,234,086 B2* | 1/2016 | Kim | ........................ C08K 13/00 |
| 2017/0113995 A1* | 4/2017 | Mastrangelo | ........ C07C 29/1285 |
| 2017/0297998 A1* | 10/2017 | Schraut | ................ B01J 19/0066 |
| 2019/0241715 A1 | 8/2019 | Kim et al. | |

FOREIGN PATENT DOCUMENTS

| | | |
|---|---|---|
| CN | 106317450 A | 1/2017 |
| CN | 109153815 A | 1/2019 |

OTHER PUBLICATIONS

Office Action received in TW patent Application No. 110127574, dated Jul. 4, 2022.
Notice of Allowance received in TW patent Application No. 110127574, dated Dec. 2, 2022.
Office Action received in TW patent Application No. 110127574, dated Jun. 7, 2022.

* cited by examiner

*Primary Examiner* — Jane L Stanley
(74) *Attorney, Agent, or Firm* — Greer, Burns & Crain, Ltd

(57) ABSTRACT

A di(2-ethylhexyl) terephthalate composition is provided. The di(2-ethylhexyl) terephthalate composition comprises di(2-ethylhexyl)terephthalate, at least one of a first component, a second component and a third component, and a fourth component When the di(2-ethylhexyl) terephthalate composition is characterized by gas chromatography (GC), the first component is eluted at a retention time ranging from 4.8 minutes to 6.0 minutes, the second component is eluted at a retention time ranging from 9.0 minutes to 10.0 minutes, the third component is eluted at a retention time ranging from 10.1 minutes to 12.0 minutes, and the fourth component is eluted at a retention time ranging from 21.0 minutes to 22.1 minutes. The ratio of the total area of the chromatographic peaks indicating the first component, second component, and third component to the area of the chromatographic peaks indicating the fourth component is 0.135 to 1.720.

15 Claims, No Drawings

DI(2-ETHYLHEXYL) TEREPHTHALATE COMPOSITION

CLAIM FOR PRIORITY

This application claims the benefit of Taiwan Patent Application No. 110127574 filed on Jul. 27, 2021, the subject matters of which are incorporated herein in their entirety by reference.

BACKGROUND

Field of the Invention

The present disclosure relates to a di(2-ethylhexyl) terephthalate composition, especially, to a di(2-ethylhexyl) terephthalate composition comprising specific components in a specific content. The di(2-ethylhexyl) terephthalate composition of the present disclosure can be used as a plasticizer for thermoplastic polymers.

Descriptions of the Related Art

Thermoplastic polymers are widely used in a variety of daily commodities, such as electric wires, toys, yoga mats, and the like. The physical properties, such as plasticity, softness, flexibility, toughness, and so forth, can be improved by adding a plasticizer in the thermoplastic polymers. Di(2-ethylhexyl) phthalate is one of the conventional plasticizers but it is considered an environmental hormone as well as a carcinogen because it may disrupt the endocrine system of a human.

In recent years, di(2-ethylhexyl) terephthalate has been used as an alternative to di(2-ethylhexyl) phthalate. However, the known di(2-ethylhexyl) terephthalate products are usually foul-smelling and have poor electrical insulation compared to di(2-ethylhexyl) phthalate. Thus, there is a need for a di(2-ethylhexyl) terephthalate plasticizer which has excellent electrical insulation properties and no unpleasant smell.

SUMMARY

Given the above, the present disclosure provides a di(2-ethylhexyl) terephthalate composition, which comprises specific components in a specific content and thus has excellent electrical insulation properties and has no unpleasant smell. The di(2-ethylhexyl) terephthalate composition of the present disclosure can be used as a plasticizer for thermoplastic polymers.

Thus, an objective of the present disclosure is to provide a di(2-ethylhexyl) terephthalate composition, which comprises di(2-ethylhexyl) terephthalate, at least one of a first component, second component and third component, and a fourth component, wherein:
when the di(2-ethylhexyl) terephthalate composition is characterized by gas chromatography (GC), the first component is eluted at a retention time ranging from 4.8 minutes to 6.0 minutes, the second component is eluted at a retention time ranging from 9.0 minutes to 10.0 minutes, the third component is eluted at a retention time ranging from 10.1 minutes to 12.0 minutes, and the fourth component is eluted at a retention time ranging from 21.0 minutes to 22.1 minutes, and the ratio of the total area of the chromatographic peaks indicating the first component, second component, and third component to the area of the chromatographic peaks indicating the fourth component is 0.135 to 1.720.

In some embodiments of the present disclosure, when using gas chromatography (GC) to characterize the di(2-ethylhexyl) terephthalate composition, the di(2-ethylhexyl) terephthalate composition is loaded into a ZB-1 capillary column of 30 meters in length, 530 µm in inner diameter and 1.5 µm in film thickness, and the characterization is conducted under the following conditions: a stationary phase of 100% polydimethylsiloxane, a carrier gas of nitrogen with a flow rate of 10 mL/min, a stepping temperature in a sequence of 50° C. for 5 minutes, then raising from 50° C. to 320° C. with a rate of 10° C./min and followed by 320° C. for 3 minutes, an inlet temperature of 220° C., a sample injection volume of the di(2-ethylhexyl) terephthalate composition of 1 µL, and use of a flame ionization detector operated at 340° C.

In some embodiments of the present disclosure, the ratio of the total area of the chromatographic peaks indicating the first component, second component, and third component to the area of the chromatographic peaks indicating the fourth component is 0.172 to 1.118.

In some embodiments of the present disclosure, di(2-ethylhexyl) terephthalate is eluted at a retention time ranging from 28.0 minutes to 31.0 minutes when the di(2-ethylhexyl) terephthalate composition is characterized by gas chromatography (GC).

In some embodiments of the present disclosure, the ratio of the area of the chromatographic peaks indicating the fourth component to the area of the chromatographic peaks indicating di(2-ethylhexyl) terephthalate is $8 \times 10^{-5}$ to $1.4 \times 10^{-4}$.

In some embodiments of the present disclosure, the di(2-ethylhexyl) terephthalate composition comprises the third component, and the ratio of the area of the chromatographic peaks indicating the third component to the area of the chromatographic peaks indicating the fourth component is 0.10 to 1.20.

In some embodiments of the present disclosure, in addition to the third component, the di(2-ethylhexyl) terephthalate composition further comprises at least one of the first component and the second component.

In some embodiments of the present disclosure, based on the total area of the chromatographic peaks of the di(2-ethylhexyl) terephthalate composition, the area of the chromatographic peaks indicating di(2-ethylhexyl) terephthalate is 99 area % or more.

In some embodiments of the present disclosure, the peak value of the chromatographic peak indicating the first component appears at a retention time ranging from 2.850 minutes to 3.150 minutes when the di(2-ethylhexyl) terephthalate composition is characterized by gas chromatography-mass spectrometry (GC-MS).

In some embodiments of the present disclosure, the fragmentation pattern of the first component comprises one or more signals at a mass-to-charge ratio (m/z) selected from the group consisting of 29, 39, 41, 42, 43, 55, and 70.

In some embodiments of the present disclosure, the fragmentation pattern of the first component comprises signals at a mass-to-charge ratio of 55 and 70.

In some embodiments of the present disclosure, the peak value of the chromatographic peak indicating the second component appears at a retention time ranging from 7.550 minutes to 7.850 minutes when the di(2-ethylhexyl) terephthalate composition is characterized by GC-MS.

In some embodiments of the present disclosure, the fragmentation pattern of the second component comprises one or more signals at a mass-to-charge ratio selected from the group consisting of 29, 41, 43, 57, and 72.

In some embodiments of the present disclosure, the fragmentation pattern of the second component comprises signals at a mass-to-charge ratio of 57 and 72.

In some embodiments of the present disclosure, the peak value of the chromatographic peak indicating the third component appears at a retention time ranging from 9.350 minutes to 9.650 minutes when the di(2-ethylhexyl) terephthalate composition is characterized by GC-MS.

In some embodiments of the present disclosure, the fragmentation pattern of the third component comprises one or more signals at a mass-to-charge ratio selected from the group consisting of 41, 43, 55, 56, 57, 70, and 83.

In some embodiments of the present disclosure, the fragmentation pattern of the third component comprises signals at a mass-to-charge ratio of 41, 43 and 57.

In some embodiments of the present disclosure, the peak value of the chromatographic peak indicating the fourth component appears at a retention time ranging from 20.450 minutes to 20.800 minutes when the di(2-ethylhexyl) terephthalate composition is characterized by GC-MS.

In some embodiments of the present disclosure, the fragmentation pattern of the fourth component comprises one or more signals at a mass-to-charge ratio selected from the group consisting of 70, 91, 112, 119, and 137.

In some embodiments of the present disclosure, the fragmentation pattern of the fourth component comprises signals at a mass-to-charge ratio of 70 and 119.

In some embodiments of the present disclosure, when using GC-MS to characterize the di(2-ethylhexyl) terephthalate composition, the di(2-ethylhexyl) terephthalate composition is loaded into a ZB-1 capillary column of 30 meters in length, 250 μm in inner diameter and 0.25 μm in film thickness, and the characterization is conducted under the following conditions: a stationary phase of 100% dimethylpolysiloxane, a carrier gas of helium with a flow rate of 1.8 mL/min, a stepping temperature in a sequence of 50° C. for 5 minutes, then raising from 50° C. to 340° C. with a rate of 10° C./min and followed by 340° C. for 6 minutes, an inlet temperature of 350° C., electron energy of 70 eV (electron volt), an ion source temperature of 250° C., use of a quadrupole mass filter, an interface temperature of 340° C., a mass scan range of 29 m/z to 1090 m/z, and a solvent delay time of 1.3 minutes.

To render the above objectives, technical features, and advantages of the present disclosure more apparent, the present disclosure will be described in detail with reference to particular embodiments hereinafter.

BRIEF DESCRIPTION OF THE DRAWINGS

Not applicable.

DETAILED DESCRIPTION

Hereinafter, particular embodiments of the present disclosure will be described in detail. However, without departing from the spirit of the present disclosure, the present disclosure may be embodied in various embodiments and should not be limited to the embodiments described in the specification.

Unless it is additionally explained, the expressions "a," "the," or the like recited in the specification and the claims should include both the singular and the plural forms.

Unless it is additionally explained, the expressions "first," "second," or the like recited in the specification and the claims are merely used to distinguish the illustrated elements or constituents without special meanings. Those expressions are not intended to indicate any priority.

Unless it is additionally explained, the term "normal pressure" recited in the specification and the claims refers to 1 (one) atmosphere (atm) (i.e., 760 torr), and the term "normal temperature" recited in the specification and the claims refers to 25° C.

In the specification and the claims, a specific component being eluted at a specific retention time range means that the chromatographic peak within the specific retention time range relates to the region represented by the specific component. The integral area of the chromatographic peak of the specific component is calculated from the integral area of the chromatographic peak within the retention time range.

In the specification and the claims, the division of the area of a chromatographic peak in the GC spectrum is as follows. A B-V-B (baseline-valley-baseline) approach is employed, wherein all chromatographic peaks are set to the same baseline, and a valley of a specific chromatographic peak is vertically lined down to the baseline to divide the area to be integrated of the specific chromatographic peak. The baseline means a signal of a carrier gas detected when no test sample passes through the detector.

In the specification and the claims, the integrated area of the chromatographic peak in the GC spectrum is obtained by using a computer program (software: GCSolution Version 2.30.00 SU) of a gas chromatograph (model no.: GC-2014, available from Shimadzu) via automatic integration, wherein the parameters are set as follows: 3 seconds for half peak width, 200 μV/min for slope, 500 μV/min for drift, 100 minutes for total DBL (time to change the peak detection parameters), and 1000 counts for minimum area/height.

Compared to the prior art, the di(2-ethylhexyl) terephthalate composition of the present disclosure has no unpleasant smell and has excellent electrical insulation properties. The di(2-ethylhexyl) terephthalate composition as well as uses thereof will be described in detail as follows.

1. Di(2-Ethylhexyl) Terephthalate Composition

The di(2-ethylhexyl) terephthalate composition of the present disclosure has a specific characteristic of GC spectrum and comprises di(2-ethylhexyl) terephthalate, at least one of a first component, a second component and a third component, and a fourth component. In some embodiments of the present disclosure, the di(2-ethylhexyl) terephthalate composition further has a specific characteristic of GC-MS spectrum.

1.1. GC Spectrum Analysis

When the di(2-ethylhexyl) terephthalate composition of the present disclosure is characterized by GC, the first component is eluted at a retention time ranging from 4.8 minutes to 6.0 minutes; that is, the wave peak (peak value) of the chromatographic peak of the first component can fall at 4.8 minutes, 4.9 minutes, 5.0 minutes, 5.1 minutes, 5.2 minutes, 5.3 minutes, 5.4 minutes, 5.5 minutes, 5.6 minutes, 5.7 minutes, 5.8 minutes, 5.9 minutes, or 6.0 minutes, or fall within a range between any two of the values described herein. When the di(2-ethylhexyl) terephthalate composition of the present disclosure is characterized by GC, the second component is eluted at a retention time ranging from 9.0 minutes to 10.0 minutes; that is, the wave peak (peak value) of the chromatographic peak of the second component can fall at 9.0 minutes, 9.1 minutes, 9.2 minutes, 9.3 minutes, 9.4 minutes, 9.5 minutes, 9.6 minutes, 9.7 minutes, 9.8 minutes, 9.9 minutes, or 10.0 minutes, or fall within a range between any two of the values described herein. When the di(2-ethylhexyl) terephthalate composition of the present disclosure is characterized by GC, the third component is eluted at a retention time ranging from 10.1 minutes to 12.0 minutes; that is, the wave peak (peak value) of the chromatographic peak of the third component can fall at 10.1 minutes, 10.2 minutes, 10.3 minutes, 10.4 minutes, 10.5 minutes, 10.6 minutes, 10.7 minutes, 10.8 minutes, 10.9 minutes, 11.0 minutes, 11.1 minutes, 11.2 minutes, 11.3 minutes, 11.4 minutes, 11.5 minutes, 11.6 minutes, 11.7 minutes, 11.8 minutes, 11.9 minutes, or 12.0 minutes, or fall within a range between any two of the values described herein. When the di(2-ethylhexyl) terephthalate composition of the present disclosure is characterized in GC, the fourth component is eluted at a retention time ranging from 21.0 minutes to 22.1 minutes; that is, the wave peak (peak value) of the chromatographic peak of the fourth component can fall at 21.0 minutes, 21.1 minutes, 21.2 minutes, 21.3 minutes, 21.4 minutes, 21.5 minutes, 21.6 minutes, 21.7 minutes, 21.8 minutes, 21.9 minutes, 22.0 minutes, or 22.1 minutes, or fall within a range between any two of the values described herein.

The first component, the second component, the third component, and the fourth component are respectively indicated by the chromatographic peaks at respective retention times in the GC spectrum, and the ratio of the total area of the chromatographic peaks indicating the first component, the second component, and the third component to the area of the chromatographic peaks of the fourth component is 0.135 to 1.720, such as 0.140, 0.145, 0.150, 0.155, 0.160, 0.165, 0.170, 0.175, 0.200, 0.225, 0.250, 0.275, 0.300, 0.325, 0.350, 0.375, 0.400, 0.425, 0.450, 0.475, 0.500, 0.525, 0.550, 0.575, 0.600, 0.625, 0.650, 0.675, 0.700, 0.725, 0.750, 0.775, 0.800, 0.825, 0.850, 0.875, 0.900, 0.925, 0.950, 0.975, 1.000, 1.025, 1.050, 1.075, 1.100, 1.105, 1.110, 1.115, 1.120, 1.125, 1.150, 1.175, 1.200, 1.225, 1.250, 1.275, 1.300, 1.325, 1.350, 1.375, 1.400, 1.425, 1.450, 1.475, 1.500, 1.525, 1.550, 1.575, 1.600, 1.625, 1.650, 1.675, or 1.700, or within a range between any two of the values described herein. In the appended examples, the ratio of the total area of the chromatographic peaks indicating the first component, the second component, and the third component to the area of the chromatographic peaks of the fourth component is 0.172 to 1.118, specifically, 0.172, 0.206, 0.444, 0.480, 0.722, or 1.118.

In some embodiments of the present disclosure, the ratio of the area of the chromatographic peaks of the third component to the area of the chromatographic peaks of the fourth component is 0.10 to 1.20, such as 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.00, 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, or 1.20, or within a range between any two of the values described herein. In the appended examples, the ratio of the area of the chromatographic peaks of the third component to the area of the chromatographic peaks of the fourth component is 0.135 to 1.118, specifically 0.135, 0.206, 0.368, 0.472, 0.722, or 1.118.

In some embodiments of the present disclosure, the ratio of the area of the chromatographic peaks of the third component to the total area of the chromatographic peaks indicating the first component, the second component, and the third component is 0.3 to 1.0, such as 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, 0.8, 0.81, 0.82, 0.83, 0.84, 0.85, 0.86, 0.87, 0.88, 0.89, 0.9, 0.91, 0.92, 0.93, 0.94, 0.95, 0.96, 0.97, 0.98, 0.99, or 1.0, or within a range between any two of the values described herein. The ratio of the area of the chromatographic peaks of the third component to the total area of the chromatographic peaks indicating the first component, the second component, and the third component is preferably 0.7 to 1.0, more preferably 0.75 to 1.0.

In addition, in some embodiments of the present disclosure, the ratio of the area of the chromatographic peaks of the first component to the total area of the chromatographic peaks indicating the first component, the second component, and the third component is 0 to 0.085, such as 0, 0.001, 0.003, 0.005, 0.008, 0.010, 0.012, 0.015, 0.017, 0.020, 0.023, 0.025, 0.028, 0.030, 0.032, 0.035, 0.037, 0.040, 0.043, 0.045, 0.048, 0.050, 0.052, 0.055, 0.057, 0.060, 0.063, 0.065, 0.068, 0.070, 0.072, 0.075, 0.078, 0.080, 0.083, or 0.085, or within a range between any two of the values described herein. In some embodiments of the present disclosure, the ratio of the area of the chromatographic peaks of the second component to the total area of the chromatographic peaks indicating the first component, the second component, and the third component is 0 to 0.250, such as 0, 0.005, 0.010, 0.018, 0.020, 0.030, 0.040, 0.050, 0.060, 0.070, 0.080, 0.090, 0.100, 0.108, 0.110, 0.120, 0.130, 0.140, 0.150, 0.160, 0.170, 0.180, 0.190, 0.200, 0.210, 0.215, 0.220, 0.230, 0.240, or 0.250, or within a range between any two of the values described herein. In some embodiments of the present disclosure, the ratio of the total area of the chromatographic peaks indicating the first component and the second component to the total area of the chromatographic peaks indicating the first component, the second component, and the third component is 0 to 0.7, preferably 0 to 0.3, more preferably 0 to 0.215, such as 0, 0.001, 0.002, 0.003, 0.004, 0.005, 0.006, 0.007, 0.008, 0.009, 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.1, 0.11, 0.12, 0.13, 0.14, 0.15, 0.16, 0.17, 0.18, 0.19, 0.2, 0.21, or 0.215, or within a range between any two of the values described herein.

In some embodiments of the present disclosure, when the di(2-ethylhexyl) terephthalate composition of the present disclosure is characterized by GC, di(2-ethylhexyl) terephthalate is eluted at a retention time ranging from 28.0 minutes to 31.0 minutes; that is, the wave peak (peak value) of the chromatographic peak of di(2-ethylhexyl) terephthalate can fall at 28.0 minutes, 28.1 minutes, 28.2 minutes, 28.3 minutes, 28.4 minutes, 28.5 minutes, 28.6 minutes, 28.7 minutes, 28.8 minutes, 28.9 minutes, 29.0 minutes, 29.1 minutes, 29.2 minutes, 29.3 minutes, 29.4 minutes, 29.5 minutes, 29.6 minutes, 29.7 minutes, 29.8 minutes, 29.8 minutes, 30.0 minutes, 30.1 minutes, 30.2 minutes, 30.3 minutes, 30.4 minutes, 30.5 minutes, 30.6 minutes, 30.7 minutes, 30.8 minutes, 30.9 minutes, or 31.0 minutes, or fall within a range between any two of the values described herein. In the appended examples, the wave peak (peak value) of the chromatographic peak of di(2-ethylhexyl) terephthalate falls at 29.3 minutes. In some embodiments of the present disclosure, di(2-ethylhexyl) terephthalate is indicated by the chromatographic peaks at respective retention times in the GC spectrum, and based on the total area of total chromatographic peaks of the di(2-ethylhexyl) terephthalate composition, the area of the chromatographic peaks of di(2-ethylhexyl) terephthalate is 99 area % or more, such as 99.1 area %, 99.2 area %, 99.3 area %, 99.4 area %, 99.5 area %, 99.6 area %, 99.7 area %, 99.8 area %, 99.9 area %, or 100 area %, or within a range between any two of the values described herein.

In some embodiments of the present disclosure, the ratio of the area of the chromatographic peaks of the fourth component to the area of the chromatographic peaks of di(2-ethylhexyl) terephthalate is $8\times10^{-5}$ to $1.4\times10^{-4}$, such as $8\times10^{-5}$, $8.1\times10^{-5}$, $8.2\times10^{-5}$, $8.3\times10^{-5}$, $8.4\times10^{-5}$, $8.5\times10^{-5}$, $8.6\times10^{-5}$, $8.7\times10^{-5}$, $8.8\times10^{-5}$, $8.9\times10^{-5}$, $9\times10^{-5}$, $9.1\times10^{-5}$, $9.2\times10^{-5}$, $9.3\times10^{-5}$, $9.4\times10^{-5}$, $9.5\times10^{-5}$, $9.6\times10^{-5}$, $9.7\times10^{-5}$, $9.8\times10^{-5}$, $9.9\times10^{-5}$, $1\times10^{-4}$, $1.1\times10^{-4}$, $1.2\times10^{-4}$, $1.3\times10^{-4}$, or $1.4\times10^{-4}$, or within a range between any two of the values described herein. In the appended examples, the ratio of the area of the chromatographic peaks of the fourth component to the area of the chromatographic peaks of di(2-ethylhexyl) terephthalate is $8.29\times10^{-5}$ to $1.34\times10^{-4}$, specifically $8.29\times10^{-5}$, $8.56\times10^{-5}$, $1.07\times10^{-4}$, $1.09\times10^{-4}$, $1.2\times10^{-4}$, $1.34\times10^{-4}$.

In some embodiments of the present disclosure, the di(2-ethylhexyl) terephthalate composition comprises di(2-ethylhexyl) terephthalate, the third component and the fourth component but does not comprise the first component and the second component. In some embodiments of the present disclosure, the di(2-ethylhexyl) terephthalate composition comprises di(2-ethylhexyl) terephthalate, the first component, the third component and the fourth component but does not comprise the second component. In some embodiments of the present disclosure, the di(2-ethylhexyl) terephthalate composition comprises di(2-ethylhexyl) terephthalate, the second component, the third component and the fourth component but does not comprise the first component. In some embodiments of the present disclosure, the di(2-ethylhexyl) terephthalate composition comprises di(2-ethylhexyl) terephthalate, the first component, the second component, the third component and the fourth component.

As used herein, the GC analysis is performed as follows. First, the pretreated di(2-ethylhexyl) terephthalate composition is loaded into a ZB-1 capillary column of 30 meters in length, 530 μm in inner diameter and 1.5 μm in film thickness. Next, the GC analysis is performed under the following conditions: a stationary phase of 100% polydimethylsiloxane, a carrier gas of nitrogen with a flow rate of 10 mL/min, a stepping temperature in a sequence of 50° C. for 5 minutes, then raising from 50° C. to 320° C. with a rate of 10° C./min and followed by 320° C. for 3 minutes, an inlet temperature of 220° C., a sample injection volume of the di(2-ethylhexyl) terephthalate composition of 1 μL, and use of a flame ionization detector operated at 340° C.

Before performing the GC analysis, it is preferred that the sample of the di(2-ethylhexyl) terephthalate composition to be analyzed is subjected to the following pretreatment. For example, the sample of the di(2-ethylhexyl) terephthalate composition can be heated in an oven at 70° C. for 1 (one) hour as a pretreatment, and then the pretreated sample is mixed with acetone (as a solvent) to prepare a solution with a concentration of 10 wt %. In some embodiments of the present disclosure, the di(2-ethylhexyl) terephthalate composition is not subjected to a pretreatment before performing the GC analysis, and the di(2-ethylhexyl) terephthalate composition is directly mixed with acetone (as a solvent) to prepare a solution with a concentration of 10 wt %.

1.2. GC-MS Spectrum Analysis

When the di(2-ethylhexyl) terephthalate composition of the present disclosure is characterized by GC-MS, the peak value of the chromatographic peak indicating the first component appears at a retention time ranging from 2.850 minutes to 3.150 minutes, specifically ranging from 2.900 minutes to 3.100 minutes, more specifically ranging from 2.920 minutes to 3.080 minutes, such as 2.920 minutes, 2.930 minutes, 2.940 minutes, 2.950 minutes, 2.960 minutes, 2.970 minutes, 2.980 minutes, 2.990 minutes, 3.000 minutes, 3.010 minutes, 3.020 minutes, 3.030 minutes, 3.040 minutes, 3.050 minutes, 3.060 minutes, 3.070 minutes, or 3.080 minutes, or appears at a retention time within a range between any two of the values described herein. In the appended examples, the peak value of the chromatographic peak indicating the first component appears at 3.004 minutes. In addition, in some embodiments of the present disclosure, the first component comprises, essentially consist of, or consist of a compound with a molecular formula of $C_8H_{16}$. Examples of the compound with a molecular formula of $C_8H_{16}$ include but are not limited to the compound of the following formula (a-1-1) and the compound of the following formula (a-1-2).

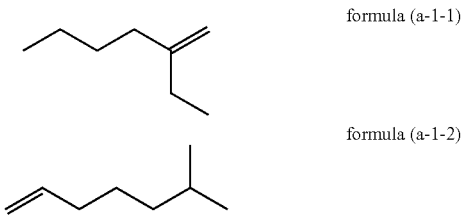

formula (a-1-1)

formula (a-1-2)

When the di(2-ethylhexyl) terephthalate composition of the present disclosure is characterized by GC-MS, the peak value of the chromatographic peak indicating the second component appears at a retention time ranging from 7.550 minutes to 7.850 minutes, specifically ranging from 7.650 minutes to 7.850 minutes, more specifically ranging from 7.670 minutes to 7.830 minutes, such as 7.670 minutes, 7.680 minutes, 7.690 minutes, 7.700 minutes, 7.710 minutes, 7.720 minutes, 7.730 minutes, 7.740 minutes, 7.750 minutes, 7.760 minutes, 7 7.770 minutes, 7.780 minutes, 7.790 minutes, 7.800 minutes, 7.810 minutes, 7.820 minutes, or 7.830 minutes, or appears at a retention time within a range between any two of the values described herein. In the appended examples, the peak value of the chromatographic peak indicating the second component appears at 7.713 minutes. In addition, in some embodiments of the present disclosure, the second component comprises isooctanal and/or isooctyl alcohol. In some embodiments of the present disclosure, the second component comprises, essentially consists of, or consists of the compound of the following formula (a-2).

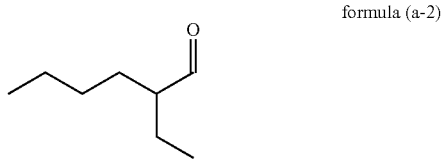

formula (a-2)

When the di(2-ethylhexyl) terephthalate composition of the present disclosure is characterized by GC-MS, the peak value of the chromatographic peak indicating the third component appears at a retention time ranging from 9.350 minutes to 9.650 minutes, specifically ranging from 9.450 minutes to 9.650 minutes, more specifically ranging from 9.470 minutes to 9.630 minutes, such as 9.470 minutes, 9.480 minutes, 9.490 minutes, 9.500 minutes, 9.510 minutes, 9.520 minutes, 9.530 minutes, 9.540 minutes, 9.550 minutes, 9.560 minutes, 9.570 minutes, 9.580 minutes, 9.590 minutes, 9.600 minutes, 9.610 minutes, 9.620 minutes, or 9.630 minutes, or appears at a retention time within a range between any two of the values described herein. In the appended examples, the peak value of the chromatographic peak indicating the third component appears at 9.537 minutes. In addition, in some embodiments of the present disclosure, the third component comprises isooctanal and/or isooctyl alcohol. In some embodiments of the present disclosure, the third component comprises, essentially consists of, or consists of the compound of the following formula (a-3).

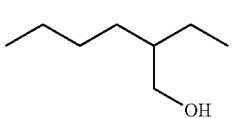

formula (a-3)

When the di(2-ethylhexyl) terephthalate composition of the present disclosure is characterized by GC-MS, the peak value of the chromatographic peak indicating the fourth component appears at a retention time ranging from 20.450 minutes to 20.800 minutes, specifically ranging from 20.550 minutes to 20.800 minutes, more specifically ranging from 20.570 minutes to 20.780 minutes, such as 20.570 minutes, 20.580 minutes, 20.590 minutes, 20.600 minutes, 20.610 minutes, 20.620 minutes, 20.630 minutes, 20.640 minutes, 20.650 minutes, 20.660 minutes, 20.670 minutes, 20.680 minutes, 20.690 minutes, 20.700 minutes, 20.710 minutes, 20.720 minutes, 20.730 minutes, 20.740 minutes, 20.750 minutes, 20.760 minutes, 20.77 minutes, or 20.780 minutes, or appears at a retention time within a range between any two of the values described herein. In the appended examples, the peak value of the chromatographic peak indicating the fourth component appears at 20.663 minutes. In some embodiments of the present disclosure, the fourth component comprises, essentially consists of, or consists of a compound with a molecular formula of $C_6H_{24}O_2$. Examples of the compound with a molecular formula of $C_6H_{24}O_2$ include but are not limited to the compound of the following formula (a-4).

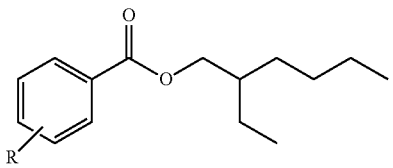

formula (a-4)

In some embodiments of the present disclosure, the fragmentation pattern of the first component comprises one or more signals at a mass-to-charge ratio (m/z) selected from the group consisting of 29, 39, 41, 42, 43, 55, and 70, and more specifically, the fragmentation pattern of the first component comprises signals at m/z of 55 and 70. In some embodiments of the present disclosure, the fragmentation pattern of the second component comprises one or more signals at m/z selected from the group consisting of 29, 41, 43, 57, and 72, and more specifically, the fragmentation pattern of the second component comprises signals at m/z of 57 and 72. In some embodiments of the present disclosure, the fragmentation pattern of the third component comprises one or more signals at m/z selected from the group consisting of 41, 43, 55, 56, 57, 70, and 83, and more specifically, the fragmentation pattern of the third component comprises signals at m/z of 41, 43 and 57. In some embodiments of the present disclosure, the fragmentation pattern of the fourth component comprises one or more signals at m/z selected from the group consisting of 70, 91, 112, 119, and 137, and more specifically, the fragmentation pattern of the fourth component comprises signals at m/z of 70 and 119.

As used herein, the GC-MS analysis is performed as below. First, the pretreated di(2-ethylhexyl) terephthalate composition is loaded into a ZB-1 capillary column of 30 meters in length, 250 μm in inner diameter, and 0.25 μm in film thickness. Next, GC-MS analysis is operated under the following conditions: a stationary phase of 100% dimethylpolysiloxane, a carrier gas of helium with a flow rate of 1.8 mL/min, a stepping temperature in a sequence of 50° C. for 5 minutes, then raising from 50° C. to 340° C. with a rate of 10° C./min and followed by 340° C. for 6 minutes, an inlet temperature of 350° C., electron energy of 70 eV, an ion source temperature of 250° C., use of a quadrupole mass filter, an interface temperature of 340° C., a mass scan range of 29 m/z to 1090 m/z, and a solvent delay time of 1.3 minutes.

In some embodiments of the present disclosure, before performing the GC-MS analysis, the di(2-ethylhexyl) terephthalate composition is directly mixed with acetone (as a solvent) to prepare a solution with a concentration of 10 wt %.

1.3. Preparation of Di(2-Ethylhexyl) Terephthalate Composition

The preparation of the di(2-ethylhexyl) terephthalate composition of the present disclosure includes the following two synthesis approaches: (1) performing a transesterification reaction by using polyethylene terephthalate and (2-ethylhexyl) alcohol; and (2) performing an esterification reaction by using terephthalic acid and (2-ethylhexyl) alcohol. In some embodiments of the present disclosure, the di(2-ethylhexyl) terephthalate composition is obtained by performing an esterification reaction by using terephthalic acid and (2-ethylhexyl) alcohol. During the preparation, the di(2-ethylhexyl) terephthalate composition of the present disclosure comprising di(2-ethylhexyl) terephthalate, at least one of a first component, second component and third component, and a fourth component, can be prepared by controlling the temperature of the transesterification reaction, post-treatment conditions, reaction pressure, reaction time and the like. In general, the amount of the first component, second component, and third component can be decreased by purging high-temperature steam, lowering the pressure of the reactor, or lowering the temperature of the transesterification reaction. Also, the amount of the first component, second component, and third component can be increased by increasing the pressure of the reactor or increasing the temperature of the transesterification reaction. The high-temperature steam purging is preferably performed for 1 (one) hour to 4 hours, and more preferably 1.5 hours to 2.5 hours to avoid decomposition of di(2-ethylhexyl) terephthalate while decreasing the amount of the first component, second component, and third component.

In some embodiments of the present disclosure, the di(2-ethylhexyl) terephthalic composition is prepared as follows. First, terephthalic acid and (2-ethylhexyl) alcohol are put into a reactor, the reactor is subjected to removal of oxygen and then purged with nitrogen. Then, the temperature in the reactor (i.e., the temperature of the reactant) is raised to 180° C. to perform a normal pressure esterification reaction for 0 to 2 hours. At the same time, dehydration also starts. Afterward, a catalyst is added and the temperature in the reactor is raised to 200° C. to 250° C. under a nitrogen atmosphere to proceed with normal pressure esterification reaction for 5 to 10 hours until the acid value of the intermediate product is 1.0 mg-KOH/g to 5.0 mg-KOH/g or lower. Next, the temperature in the reactor is maintained at 200° C. to 250° C. while the pressure in the reactor is reduced to 500 torr to 300 torr to perform a reduced pressure esterification reaction for 0 to 4 hours. Afterward, the pressure in the reactor is further reduced to 0 torr, and the temperature in the reactor is lowered to 170° C. to 230° C. to recover a crude product. The crude product is subjected to neutralization water washing under 65° C. to 95° C. and normal pressure once, and then the crude product is purged with 110° C. to 180° C. steam under normal pressure for 0 to 180 minutes. Next, the pressure in the reactor is reduced to 0 torr and the temperature in the reactor is lowered to 90° C. to 130° C. to remove water. Then, 0.05 wt % to 0.1 wt % of filter aid (such as diatomaceous earth HYFLO) is added into the crude product to perform a pretreatment before filtration. The duration of the pretreatment before filtration is not particularly limited, and for example, can be 5 minutes to 15 minutes. Afterward, the crude product is filtered by using filter under 50° C. to 90° C. The filtered product is subjected to a post-treatment to obtain the di(2-ethylhexyl) terephthalate composition. The aforementioned post-treatment is directed to a treatment which places the product under a specific temperature in a specific atmosphere for a period to optimize the physicochemical properties of the product. Specifically, the temperature of the post-treatment suitable for the present disclosure is 170° C. to 200° C., preferably 175° C. to 195° C., and more preferably 180° C. to 190° C. The atmosphere of the post-treatment suitable for the present disclosure can be selected from the group consisting of air, nitrogen, argon, helium, neon, and combinations thereof. In the appended examples, nitrogen is used to perform the post-treatment.

The aforementioned catalyst used for esterification can be selected from the group consisting of sulfuric acid, methanesulfonic acid, p-toluenesulfonic acid, tin, tin oxide, butyltin hydroxide oxide, tin oxalate, titanium, titanate, zirconium n-butoxide, sodium methoxide, potassium methoxide, and combinations thereof, but the present disclosure is not limited thereto. The aforementioned titanate can be tetraisopropyl titanate or tetrabutyl titanate. In the appended examples, titanate is used as the catalyst.

2. Applications of Di(2-Ethylhexyl) Terephthalate Composition

The di(2-ethylhexyl) terephthalate composition of the present disclosure can be used as a plasticizer for thermoplastic polymers. Examples of the aforementioned thermoplastic polymers include but are not limited to the follows: polyvinyl chloride (PVC); polyvinylidene chloride (PVDC); polyacrylate, such as polymethyl methacrylate (PMMA), polyalkyl methacrylate (PAMA); polyurea; silicon polymer, such as silicone; fluoropolymer, such as polytetrafluoroethylene (PTFE); polyvinyl acetate (PVAc); ethylene-vinyl acetate copolymer (EVA); vinyl acetate-ethylene copolymer (VAE); polyvinyl alcohol (PVA); polyvinyl acetal, such as polyvinyl butyral (PVB); polystyrene polymer, such as polystyrene (PS), expanded polystyrene (EPS), acrylonitrile-styrene acrylate (ASA), styrene acrylonitrile (SAN), acrylonitrile-butadienestyrene (ABS), styrene-maleic anhydride copolymer (SMA), styrene-methylacrylic acid copolymer; thermoplastic polyolefin, such as polyethylene (PE) or polypropylene (PP); polyethylene vinyl acetate (PEVA); polycarbonate; polyethylene terephthalate (PET); polybutylene terephthalate (PBT); polyoxymethylene (POM); polyamide (PA); polyethylene glycol (PEG); thermoplastic polyurethane (TPU); polysulfide (PSu); biological polymer, such as polylactic acid (PLA); polyhydroxybutyral (PHB); polyhydroxyvalerate (PHV); starch; cellulose and cellulose derivatives, such as nitrocellulose (NC), ethylcellulose (EC), cellulose acetate (CA), cellulose acetate butyrate (CAB); and rubber, such as nitrile butadiene rubber (NBR), styrene-butadiene rubber (SBR). The application objects of the di(2-ethylhexyl) terephthalate composition of the present disclosure are preferably PVC, NBR, SBR, EVA, TPU, NC (such as NC lacquers), or VAE.

Examples of the application of the thermoplastic polymers that comprise the di(2-ethylhexyl) terephthalate composition of the present disclosure include but are not limited to adhesives, sealants, coating materials, paints, inks, plastic sols, foams, synthetic leathers, paving materials, roof films, fabric coatings, cables, coil insulants, rubber adhesive tapes, gloves, hoses, extruding objects, films, vehicle interior trims, wall coverings, liquid inks, toys, contact plates, food packaging, and medical devices.

3. Example

3.1. Test Methods

[GC Spectrum Analysis]

First, a sample of di(2-ethylhexyl) terephthalate composition is mixed with acetone (solvent) to prepare a solution with a concentration of 10 wt %.

Next, the sample of di(2-ethylhexyl) terephthalate composition is loaded into a ZB-1 capillary column of 30 meters in length, 530 μm in inner diameter, and a film thickness of 1.5 μm. Then, the GC analysis is operated under the following conditions: a stationary phase of 100% dimethylpolysiloxane, a carrier gas of nitrogen with a flow rate of 10 mL/min, a stepping heating operation with a temperature in a sequence of 50° C. for 5 minutes, then raising from 50° C. to 320° C. with a rate of 10° C./min and followed by 320° C. for 3 minutes, an inlet temperature of 220° C., a sample injection volume of the di(2-ethylhexyl) terephthalate composition of 1 μL, and use of a flame ionization detector operated at 340° C.

The integral areas of the first component, the second component, the third component, the fourth component and di(2-ethylhexyl) terephthalate are obtained by using the computer automatic integration (software: GCSolution Version 2.30.00 SU3). In the following tables, the integral areas of the first component (1), the second component (2), the third component (3), the fourth component (4) and di(2-ethylhexyl) terephthalate (5) are respectively represented by the number 1, 2, 3, 4, 5. For example, "(1+2+3)/4" means the ratio of the total area of the chromatographic peaks of the first component, the second component and the third component to the area of the chromatographic peak of the fourth component. "4/5" means the ratio of the area of the chromatographic peak of the fourth area to the area of the chromatographic peak of di(2-ethylhexyl) terephthalate.

[Measurement of Volume Impedance]

The di(2-ethylhexyl) terephthalate composition is loaded into HIOKI SME-8330 liquid sample electrode and measured by using a super megohm meter (model: SM-7110, available from HIOKI) to obtain a volume impedance value (unit: S2-cm).

[Odor Evaluation]

The evaluation of odor of di(2-ethylhexyl) terephthalate composition is conducted through human olfaction. First, a questionnaire is designed to evaluate the degree of odor with scores 1 to 5, wherein score 1 represents no odor, score 2 represents a very slight odor, score 3 represents a distinct but not uncomfortable odor, score 4 represents a distinct and uncomfortable odor, and score 5 represents an unpleasantly pungent odor. Next, five testing personnel are required to smell the sample of di(2-ethylhexyl) terephthalate composition and fill out the questionnaire. The scores evaluated by the 5 testing personnel are averaged to obtain the score of odor.

3.2. Preparation of Di(2-Ethylhexyl) Terephthalate Composition

Example 1

Terephthalic acid and (2-ethylhexyl) alcohol were put into a reactor. Oxygen in the reactor was removed and the reactor was purged with nitrogen. Then, the temperature in the reactor (i.e., the temperature of the reactant) was raised to 180° C. to perform a normal pressure esterification reaction for 1 hour. At the same time, dehydration also started. Afterward, a catalyst (titanate) was added into the reactor and the temperature in the reactor was raised to 230° C. under a nitrogen atmosphere to proceed with the normal pressure esterification reaction for 6.5 hours until the acid value of the intermediate product is lower than 1.0 mg-KOH/g. Next, the temperature in the reactor was maintained at 230° C. and the pressure in the reactor was reduced to 500 torr to perform a reduced pressure esterification reaction for 1 hour. After the crude product was subjected to neutralization water washing under 80° C. and normal pressure once, the temperature in the reactor was raised to 150° C. to recover excess alcohol. The crude product was purged with a steam of 150° C. under 50 torr for 120 minutes, and then the pressure in the reactor was reduced to 0 torr and the temperature in the reactor was lowered to 100° C. to remove water. Next, 0.1 wt % of filter aid (diatomaceous earth HYFLO) was added into the crude product to perform a pretreatment before filtration for 15 minutes, and the crude product was then filtered by using filter under 70° C. The filtered product was subjected to a post-treatment at 180° C. under a nitrogen atmosphere for 30 minutes to obtain the di(2-ethylhexyl) terephthalate composition of Example 1.

Example 2

Terephthalic acid and (2-ethylhexyl) alcohol were put into a reactor. Oxygen in the reactor was removed and the reactor was purged with nitrogen. Then, the temperature in the reactor was raised to 180° C. to perform a normal pressure esterification reaction for 1 hour. At the same time, dehydration also started. Afterward, a catalyst (titanate) was added into the reactor and the temperature in the reactor was raised to 225° C. under a nitrogen atmosphere to proceed with the normal pressure esterification reaction for 7 hours until the acid value of the intermediate product is lower than 1.0 mg-KOH/g. Next, the temperature in the reactor was maintained at 225° C. and the pressure in the reactor was reduced to 460 torr to perform a reduced pressure esterification reaction for 1.5 hours. After the crude product was subjected to neutralization water washing under 70° C. and normal pressure once, the temperature in the reactor was raised to 150° C. to recover excess alcohol. The crude product was purged with a steam of 150° C. under 50 torr for 120 minutes, and then the pressure in the reactor was reduced to 0 torr and the temperature in the reactor was lowered to 100° C. to remove water. Next, 0.1 wt % of filter aid (diatomaceous earth HYFLO) was added into the crude product to perform a pretreatment before filtration for 15 minutes, and the crude product was then filtered by using filter under 70° C. The filtered product was subjected to a post-treatment at 180° C. under a nitrogen atmosphere for 60 minutes to obtain the di(2-ethylhexyl) terephthalate composition of Example 2.

Example 3

Terephthalic acid and (2-ethylhexyl) alcohol were put into a reactor. Oxygen in the reactor was removed and the reactor was purged with nitrogen. Then, the temperature in the reactor was raised to 180° C. to perform a normal pressure esterification reaction for 1 hour. At the same time, dehydration also started. Afterward, a catalyst (titanate) was added into the reactor and the temperature in the reactor was raised to 220° C. under a nitrogen atmosphere to proceed with the normal pressure esterification reaction for 7.5 hours until the acid value of the intermediate product is lower than 1.0 mg-KOH/g. Next, the temperature in the reactor was maintained at 220° C. and the pressure in the reactor was reduced to 460 torr to perform a reduced pressure esterification reaction for 1.5 hours. After the crude product was subjected to neutralization water washing under 90° C. and normal pressure once, the temperature in the reactor was raised to 150° C. to recover excess alcohol. The crude product was purged with a steam of 150° C. under 50 torr for 120 minutes, and then the pressure in the reactor was reduced to 0 torr and the temperature in the reactor was lowered to 100° C. to remove water. Next, 0.1 wt % of filter aid (diatomaceous earth HYFLO) was added into the crude product to perform a pretreatment before filtration for 15 minutes, and the crude product was then filtered by using filter under 70° C. The filtered product was subjected to a post-treatment at 180° C. under a nitrogen atmosphere for 120 minutes to obtain the di(2-ethylhexyl) terephthalate composition of Example 3.

Example 4

Terephthalic acid and (2-ethylhexyl) alcohol were put into a reactor. Oxygen in the reactor was removed and the reactor was purged with nitrogen. Then, the temperature in the reactor was raised to 180° C. to perform a normal pressure esterification reaction for 1 hour. At the same time, dehydration also started. Afterward, a catalyst (titanate) was added into the reactor and the temperature in the reactor was raised to 240° C. under a nitrogen atmosphere to proceed with the normal pressure esterification reaction for 6 hours until the acid value of the intermediate product is lower than 1.0 mg-KOH/g. Next, the temperature in the reactor was maintained at 240° C. and the pressure in the reactor was reduced to 500 torr to perform a reduced pressure esterification reaction for 1 hour. After the crude product was subjected to neutralization water washing under 80° C. and normal pressure once, the temperature in the reactor was raised to 150° C. to recover excess alcohol. The crude product was purged with a steam of 150° C. under 50 torr for 120 minutes, and then the pressure in the reactor was reduced to 0 torr and the temperature in the reactor was lowered to 100° C. to remove water. Next, 0.1 wt % of filter aid (diatomaceous earth HYFLO) was added into the crude product to perform a pretreatment before filtration for 15 minutes, and the crude product was then filtered by using filter under 70° C. The filtered product was subjected to a post-treatment at 190° C. under a nitrogen atmosphere for 30 minutes to obtain the di(2-ethylhexyl) terephthalate composition of Example 4.

Example 5

Terephthalic acid and (2-ethylhexyl) alcohol were put into a reactor. Oxygen in the reactor was removed and the reactor was purged with nitrogen. Then, the temperature in the reactor was raised to 180° C. to perform a normal pressure esterification reaction for 1 hour. At the same time, dehydration also started. Afterward, a catalyst (titanate) was added into the reactor and the temperature in the reactor was raised to 240° C. under a nitrogen atmosphere to proceed with the normal pressure esterification reaction for 6 hours until the acid value of the intermediate product is lower than 1.0 mg-KOH/g. Next, the temperature in the reactor was maintained at 240° C. and the pressure in the reactor was reduced to 500 torr to perform a reduced pressure esterification reaction for 1 hour. After the crude product was subjected to neutralization water washing under 90° C. and normal pressure once, the temperature in the reactor was raised to 150° C. to recover excess alcohol. The crude product was purged with a steam of 160° C. under 50 torr for 90 minutes, and then the pressure in the reactor was reduced to 0 torr and the temperature in the reactor was lowered to 100° C. to remove water. Next, 0.1 wt % of filter aid (diatomaceous earth HYFLO) was added into the crude product to perform a pretreatment before filtration for 15 minutes, and the crude product was then filtered by using filter under 70° C. The filtered product was subjected to a post-treatment at 190° C. under a nitrogen atmosphere for 60 minutes to obtain the di(2-ethylhexyl) terephthalate composition of Example 5.

Example 6

Terephthalic acid and (2-ethylhexyl) alcohol were put into a reactor. Oxygen in the reactor was removed and the reactor was purged with nitrogen. Then, the temperature in the reactor was raised to 180° C. to perform a normal pressure esterification reaction for 1 hour. At the same time, dehydration also started. Afterward, a catalyst (titanate) was added into the reactor and the temperature in the reactor was raised to 235° C. under a nitrogen atmosphere to proceed with the normal pressure esterification reaction for 6.5 hours until the acid value of the intermediate product is lower than 1.0 mg-KOH/g. Next, the temperature in the reactor was maintained at 235° C. and the pressure in the reactor was reduced to 500 torr to perform a reduced pressure esterification reaction for 1 hour. After the crude product was subjected to neutralization water washing under 80° C. and normal pressure once, the temperature in the reactor was raised to 170° C. to recover excess alcohol. The crude product was purged with a steam of 160° C. under 50 torr for 120 minutes, and then the pressure in the reactor was reduced to 0 torr and the temperature in the reactor was lowered to 100° C. to remove water. Next, 0.1 wt % of filter aid (diatomaceous earth HYFLO) was added into the crude product to perform a pretreatment before filtration for 15 minutes, and the crude product was then filtered by using filter under 70° C. The filtered product was subjected to a post-treatment at 190° C. under a nitrogen atmosphere for 120 minutes to obtain the di(2-ethylhexyl) terephthalate composition of Example 6.

Comparative Example 1

Terephthalic acid and (2-ethylhexyl) alcohol were put into a reactor. Oxygen in the reactor was removed and the reactor was purged with nitrogen. Then, the temperature in the reactor was raised to 180° C. to perform a normal pressure esterification reaction for 1 hour. At the same time, dehydration also started. Afterward, a catalyst (titanate) was added into the reactor and the temperature in the reactor was raised to 235° C. under a nitrogen atmosphere to proceed with the normal pressure esterification reaction for 6.5 hours until the acid value of the intermediate product is lower than 1.0 mg-KOH/g. Next, the temperature in the reactor was maintained at 235° C. and the pressure in the reactor was reduced to 500 torr to perform a reduced pressure esterification reaction for 1 hour. After the crude product was subjected to neutralization water washing under 100° C. and normal pressure once, the temperature in the reactor was raised to 150° C. to recover excess alcohol. The crude product was purged with a steam of 150° C. under 50 torr for 120 minutes, and then the pressure in the reactor was reduced to 0 torr and the temperature in the reactor was lowered to 100° C. to remove water. Next, 0.1 wt % of filter aid (diatomaceous earth HYFLO) was added into the crude product to perform a pretreatment before filtration for 15 minutes, and the crude product was then filtered by using filter under 70° C. The filtered product was subjected to a post-treatment at 180° C. under a nitrogen atmosphere for 180 minutes to obtain the di(2-ethylhexyl) terephthalate composition of Comparative Example 1.

Comparative Example 2

Terephthalic acid and (2-ethylhexyl) alcohol were put into a reactor. Oxygen in the reactor was removed and the reactor was purged with nitrogen. Then, the temperature in the reactor was raised to 180° C. to perform a normal pressure esterification reaction for 1 hour. At the same time, dehydration also started. Afterward, a catalyst (titanate) was added into the reactor and the temperature in the reactor was raised to 225° C. under a nitrogen atmosphere to proceed with the normal pressure esterification reaction for 7 hours until the acid value of the intermediate product is lower than 1.0 mg-KOH/g. Next, the temperature in the reactor was maintained at 225° C. and the pressure in the reactor was reduced to 460 torr to perform a reduced pressure esterification reaction for 1.5 hours. After the crude product was subjected to neutralization water washing under 90° C. and normal pressure once, the temperature in the reactor was raised to 170° C. to recover excess alcohol. The crude product was purged with a steam of 150° C. under 50 torr for 120 minutes, and then the pressure in the reactor was reduced to 0 torr and the temperature in the reactor was lowered to 100° C. to remove water. Next, 0.1 wt % of filter aid (diatomaceous earth HYFLO) was added into the crude product to perform a pretreatment before filtration for 15 minutes, and the crude product was then filtered by using filter under 70° C. The filtered product was subjected to a post-treatment at 180° C. under a nitrogen atmosphere for 240 minutes to obtain the di(2-ethylhexyl) terephthalate composition of Comparative Example 2.

Comparative Example 3

Terephthalic acid and (2-ethylhexyl) alcohol were put into a reactor. Oxygen in the reactor was removed and the reactor was purged with nitrogen. Then, the temperature in the reactor was raised to 180° C. to perform a normal pressure esterification reaction for 1 hour. At the same time, dehydration also started. Afterward, a catalyst (titanate) was added into the reactor and the temperature in the reactor was raised to 220° C. under a nitrogen atmosphere to proceed with the normal pressure esterification reaction for 7.5 hours until the acid value of the intermediate product is 1.0 mg-KOH/g or lower. Next, the temperature in the reactor was maintained at 220° C. and the pressure in the reactor was reduced to 460 torr to perform a reduced pressure esterification reaction for 1.5 hours. After the crude product was subjected to neutralization water washing under 90° C. and normal pressure once, the temperature in the reactor was raised to 170° C. to recover excess alcohol. The crude product was purged with a steam of 160° C. under 50 torr for 90 minutes, and then the pressure in the reactor was reduced to 0 torr and the temperature in the reactor was lowered to 100° C. to remove water. Next, 0.1 wt % of filter aid (diatomaceous earth HYFLO) was added into the crude product to perform a pretreatment before filtration for 15 minutes, and the crude product was then filtered by using filter under 70° C. The filtered product was subjected to a post-treatment at 180° C. under an air atmosphere for 15 minutes to obtain the di(2-ethylhexyl) terephthalate composition of Comparative Example 3.

Comparative Example 4

Terephthalic acid and (2-ethylhexyl) alcohol were put into a reactor. Oxygen in the reactor was removed and the reactor was purged with nitrogen. Then, the temperature in the reactor was raised to 180° C. to perform a normal pressure esterification reaction for 1 hour. At the same time, dehydration also started. Afterward, a catalyst (titanate) was added into the reactor and the temperature in the reactor was raised to 215° C. under a nitrogen atmosphere to proceed with the normal pressure esterification reaction for 9 hours until the acid value of the intermediate product is 2.0 mg-KOH/g or lower. Next, the temperature in the reactor was maintained at 215° C. and the pressure in the reactor was reduced to 460 torr to perform a reduced pressure esterification reaction for 1.5 hours. After the crude product was subjected to neutralization water washing under 80° C. and normal pressure once, the temperature in the reactor was raised to 170° C. to recover excess alcohol. The crude product was purged with a steam of 160° C. under 50 torr for 90 minutes, and then the pressure in the reactor was reduced to 0 torr and the temperature in the reactor was lowered to 100° C. to remove water. Next, 0.1 wt % of filter aid (diatomaceous earth HYFLO) was added into the crude product to perform a pretreatment before filtration for 15 minutes, and the crude product was then filtered by using filter under 70° C. The filtered product was subjected to a post-treatment at 180° C. under an air atmosphere for 30 minutes to obtain the di(2-ethylhexyl) terephthalate composition of Comparative Example 4.

Comparative Example 5

Terephthalic acid and (2-ethylhexyl) alcohol were put into a reactor. Oxygen in the reactor was removed and the reactor was purged with nitrogen. Then, the temperature in the reactor was raised to 180° C. to perform a normal pressure esterification reaction for 1 hour. At the same time, dehydration also started. Afterward, a catalyst (titanate) was added into the reactor and the temperature in the reactor was raised to 240° C. under a nitrogen atmosphere to proceed with the normal pressure esterification reaction for 6 hours until the acid value of the intermediate product is 1.0 mg-KOH/g or lower. Next, the temperature in the reactor was maintained at 240° C. and the pressure in the reactor was reduced to 500 torr to perform a reduced pressure esterification reaction for 1 hour. After the crude product was subjected to neutralization water washing under 70° C. and normal pressure once, the temperature in the reactor was raised to 150° C. to recover excess alcohol. The crude product was purged with a steam of 160° C. under 50 torr for 90 minutes, and then the pressure in the reactor was reduced to 0 torr and the temperature in the reactor was lowered to 100° C. to remove water. Next, 0.1 wt % of filter aid (diatomaceous earth HYFLO) was added into the crude product to perform a pretreatment before filtration for 15 minutes, and the crude product was then filtered by using filter under 70° C. The filtered product was subjected to a post-treatment at 180° C. under an air atmosphere for 45 minutes to obtain the di(2-ethylhexyl) terephthalate composition of Comparative Example 5.

Comparative Example 6

Terephthalic acid and (2-ethylhexyl) alcohol were put into a reactor. Oxygen in the reactor was removed and the reactor was purged with nitrogen. Then, the temperature in the reactor was raised to 180° C. to perform a normal pressure esterification reaction for 1 hour. At the same time, dehydration also started. Afterward, a catalyst (titanate) was added into the reactor and the temperature in the reactor was raised to 250° C. under a nitrogen atmosphere to proceed with the normal pressure esterification reaction for 5.5 hours until the acid value of the intermediate product is 1.0 mg-KOH/g or lower. Next, the temperature in the reactor was maintained at 250° C. and the pressure in the reactor was reduced to 660 torr to perform a reduced pressure esterification reaction for 1 hour. After the crude product was subjected to neutralization water washing under 80° C. and normal pressure once, the temperature in the reactor was raised to 170° C. to recover excess alcohol. The crude product was purged with a steam of 150° C. under 50 torr for 90 minutes, and then the pressure in the reactor was reduced to 0 torr and the temperature in the reactor was lowered to 100° C. to remove water. Next, 0.1 wt % of filter aid (diatomaceous earth HYFLO) was added into the crude product to perform a pretreatment before filtration for 15 minutes, and the crude product was then filtered by using filter under 70° C. The filtered product was subjected to a post-treatment at 180° C. under an air atmosphere for 60 minutes to obtain the di(2-ethylhexyl) terephthalate composition of Comparative Example 6.

Comparative Example 7

Terephthalic acid and (2-ethylhexyl) alcohol were put into a reactor. Oxygen in the reactor was removed and the reactor was purged with nitrogen. Then, the temperature in the reactor was raised to 180° C. to perform a normal pressure esterification reaction for 1 hour. At the same time, dehydration also started. Afterward, a catalyst (titanate) was added into the reactor and the temperature in the reactor was raised to 230° C. under a nitrogen atmosphere to proceed with the normal pressure esterification reaction for 6.5 hours until the acid value of the intermediate product is 1.0 mg-KOH/g or lower. Next, the temperature in the reactor was maintained at 230° C. and the pressure in the reactor was reduced to 500 torr to perform a reduced pressure esterification reaction for 1 hour. After the crude product was subjected to neutralization water washing under 100° C. and normal pressure once, the temperature in the reactor was raised to 170° C. to recover excess alcohol. The crude product was purged with a steam of 150° C. under 50 torr for 120 minutes, and then the pressure in the reactor was reduced to 0 torr and the temperature in the reactor was lowered to 100° C. to remove water. Next, 0.1 wt % of filter aid (diatomaceous earth HYFLO) was added into the crude product to perform a pretreatment before filtration for 15 minutes, and the crude product was then filtered by using filter under 70° C. The filtered product was subjected to a post-treatment at 180° C. under an air atmosphere for 75 minutes to obtain the di(2-ethylhexyl) terephthalate composition of Comparative Example 7.

The properties of the di(2-ethylhexyl) terephthalate composition of Examples 1 to 6 and Comparative Examples 1 to 7, including GC spectrum and volume impedance, were measured according to the aforementioned testing methods. In addition, the odor evaluation of the di(2-ethylhexyl) terephthalate composition of Examples 1 to 6 and Comparative Examples 1 to 7 is performed according to the aforementioned evaluation method. The results are listed in Table 1.

TABLE 1

Properties of the di(2-ethylhexyl) terephthalate composition of Examples 1 to 6 and Comparative Examples 1 to 7

|  |  | (1 + 2 + 3)/4 | 4/5 | 3/4 | Volume impedance (unit: Ω-cm) | Odor evaluation |
|---|---|---|---|---|---|---|
| Example | 1 | 0.722 | $1.07 \times 10^{-4}$ | 0.722 | $4.4 \times 10^{12}$ | 1.2 |
|  | 2 | 0.206 | $8.6 \times 10^{-5}$ | 0.206 | $4.8 \times 10^{12}$ | 1.4 |
|  | 3 | 0.172 | $8.3 \times 10^{-5}$ | 0.135 | $4.1 \times 10^{12}$ | 1.6 |
|  | 4 | 0.480 | $1.2 \times 10^{-4}$ | 0.472 | $6.3 \times 10^{12}$ | 2.4 |
|  | 5 | 1.118 | $1.3 \times 10^{-4}$ | 1.118 | $4.0 \times 10^{12}$ | 2 |
|  | 6 | 0.444 | $1.1 \times 10^{-4}$ | 0.368 | $4.0 \times 10^{12}$ | 2.2 |
| Comparative Example | 1 | 0.132 | $8.3 \times 10^{-5}$ | 0.092 | $3.0 \times 10^{12}$ | 1.6 |
|  | 2 | 0.091 | $8.4 \times 10^{-5}$ | 0.061 | $1.8 \times 10^{12}$ | 1.8 |
|  | 3 | 2.053 | $1.1 \times 10^{-4}$ | 1.056 | $5.0 \times 10^{12}$ | 4.4 |
|  | 4 | 2.366 | $1.1 \times 10^{-4}$ | 1.074 | $4.8 \times 10^{12}$ | 4.8 |
|  | 5 | 2.344 | $1.1 \times 10^{-4}$ | 1.035 | $5.0 \times 10^{12}$ | 4.8 |
|  | 6 | 2.720 | $1.1 \times 10^{-4}$ | 1.018 | $4.6 \times 10^{12}$ | 5 |
|  | 7 | 1.728 | $9.6 \times 10^{-5}$ | 0.615 | $4.5 \times 10^{12}$ | 4.4 |

As shown in Table 1, the di(2-ethylhexyl) terephthalate composition of the present disclosure has a volume impedance of at least $4.0 \times 10^{12}$ Ω-cm and has a low odor. By contrast, as shown in Comparative Examples 1 to 7, the comparative di(2-ethylhexyl) terephthalate composition does not have excellent volume impedance or low odor. Particularly, Comparative Examples 1 and 2 show that, when the ratio of the total area of the chromatographic peaks indicating the first component, second component, and third component to the area of the chromatographic peaks indicating the fourth component is lower than the designated range as indicated by the present disclosure, the di(2-ethylhexyl) terephthalate composition is provided with poor volume impedance. Comparative Examples 3 to 7 show that, when the ratio of the total area of the chromatographic peaks indicating the first component, second component, and third component to the area of the chromatographic peaks indicating the fourth component is higher than the designated range as indicated by the present disclosure, the di(2-ethylhexyl) terephthalate composition has strong and uncomfortable odor.

The above examples are used to illustrate the principle and efficacy of the present disclosure and show the inventive features thereof but are not used to limit the scope of the present disclosure. People skilled in this field may proceed with a variety of modifications and replacements based on the disclosures and suggestions of the invention as described without departing from the principle and spirit thereof. Therefore, the scope of protection of the present disclosure is that as defined in the claims as appended.

What is claimed is:

1. A di(2-ethylhexyl) terephthalate composition comprising di(2-ethylhexyl) terephthalate, optionally a first component, optionally a second component, a third component, and a fourth component, wherein:
  when the di(2-ethylhexyl) terephthalate composition is characterized by gas chromatography (GC), the first component is eluted at a retention time ranging from 4.8 minutes to 6.0 minutes, the second component is eluted at a retention time ranging from 9.0 minutes to 10.0 minutes, the third component is eluted at a retention time ranging from 10.1 minutes to 12.0 minutes, and the fourth component is eluted at a retention time ranging from 21.0 minutes to 22.1 minutes, and the ratio of the total area of the chromatographic peaks indicating the first component, second component, and third component to the area of the chromatographic peaks indicating the fourth component is 0.172 to 1.118;
  wherein the ratio of the area of the chromatographic peaks indicating the third component to the area of the chromatographic peaks indicating the fourth component is 0.135 to 1.118;
  wherein when using gas chromatography (GC) to characterize the di(2-ethylhexyl) terephthalate composition, the di(2-ethylhexyl) terephthalate composition is loaded into a ZB-1 capillary column of 30 meters in length, 530 μm in inner diameter and 1.5 μm in film thickness, and the characterization is conducted under the following conditions: a stationary phase of 100% polydimethylsiloxane, a carrier gas of nitrogen with a flow rate of 10 mL/min, a stepping temperature in a sequence of 50° C. for 5 minutes, then raising from 50° C. to 320° C. with a rate of 10° C./min and followed by 320° C. for 3 minutes, an inlet temperature of 220° C., a sample injection volume of the di(2-ethylhexyl) terephthalate composition of 1 μL, and use of a flame ionization detector operated at 340° C.; and
  wherein di(2-ethylhexyl) terephthalate is eluted at a retention time ranging from 28.0 minutes to 31.0 minutes when the di(2-ethylhexyl) terephthalate composition is characterized by gas chromatography (GC), and based on the total area of the chromatographic peaks of the di(2-ethylhexyl) terephthalate composition, the area of the chromatographic peaks indicating di(2-ethylhexyl) terephthalate is 99 area % or more.

2. The di(2-ethylhexyl) terephthalate composition of claim 1, wherein the ratio of the area of the chromatographic peaks indicating the fourth component to the area of the chromatographic peaks indicating di(2-ethylhexyl) terephthalate is $8\times10^{-5}$ to $1.4\times10^{-4}$.

3. The di(2-ethylhexyl) terephthalate composition of claim 1, which further comprises at least one of the first component and the second component.

4. The di(2-ethylhexyl) terephthalate composition of claim 1, wherein the peak value of the chromatographic peak indicating the first component appears at a retention time ranging from 2.850 minutes to 3.150 minutes when the di(2-ethylhexyl) terephthalate composition is characterized by gas chromatography-mass spectrometry (GC-MS).

5. The di(2-ethylhexyl) terephthalate composition of claim 4, wherein the fragmentation pattern of the first component comprises one or more signals at a mass-to-charge ratio (m/z) selected from the group consisting of 29, 39, 41, 42, 43, 55, and 70.

6. The di(2-ethylhexyl) terephthalate composition of claim 4, wherein the fragmentation pattern of the first component comprises signals at a mass-to-charge ratio of 55 and 70.

7. The di(2-ethylhexyl) terephthalate composition of claim 1, wherein the peak value of the chromatographic peak indicating the second component appears at a retention time ranging from 7.550 minutes to 7.850 minutes when the di(2-ethylhexyl) terephthalate composition is characterized by GC-MS.

8. The di(2-ethylhexyl) terephthalate composition of claim 7, wherein the fragmentation pattern of the second component comprises one or more signals at a mass-to-charge ratio selected from the group consisting of 29, 41, 43, 57, and 72.

9. The di(2-ethylhexyl) terephthalate composition of claim 7, wherein the fragmentation pattern of the second component comprises signals at a mass-to-charge ratio of 57 and 72.

10. The di(2-ethylhexyl) terephthalate composition of claim 1, wherein the peak value of the chromatographic peak indicating the third component appears at a retention time ranging from 9.350 minutes to 9.650 minutes when the di(2-ethylhexyl) terephthalate composition is characterized by GC-MS.

11. The di(2-ethylhexyl) terephthalate composition of claim 10, wherein the fragmentation pattern of the third component comprises one or more signals at a mass-to-charge ratio selected from the group consisting of 41, 43, 55, 56, 57, 70, and 83.

12. The di(2-ethylhexyl) terephthalate composition of claim 10, wherein the fragmentation pattern of the third component comprises signals at a mass-to-charge ratio of 41, 43 and 57.

13. The di(2-ethylhexyl) terephthalate composition of claim 1, wherein the peak value of the chromatographic peak indicating the fourth component appears at a retention time ranging from 20.450 minutes to 20.800 minutes when the di(2-ethylhexyl) terephthalate composition is characterized by GC-MS.

14. The di(2-ethylhexyl) terephthalate composition of claim 13, wherein the fragmentation pattern of the fourth component comprises one or more signals at a mass-to-charge ratio selected from the group consisting of 70, 91, 112, 119, and 137.

15. The di(2-ethylhexyl) terephthalate composition of claim 13, wherein the fragmentation pattern of the fourth component comprises signals at a mass-to-charge ratio of 70 and 119.

\* \* \* \* \*